Figure 1:
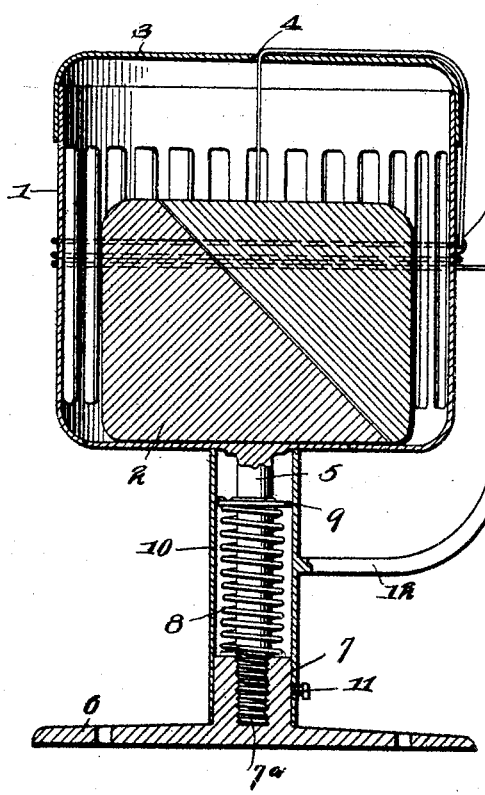

No. 783,065. PATENTED FEB. 21, 1905.
J. M. J. NESS.
CORD HOLDER.
APPLICATION FILED JULY 2, 1904.

Witnesses

Jens M. J. Ness Inventor

No. 783,065. Patented February 21, 1905.

UNITED STATES PATENT OFFICE.

JENS M. J. NESS, OF MADDOCK, NORTH DAKOTA, ASSIGNOR OF ONE-HALF TO JOAKIM HAMMER AND WESLEY STYLES, OF MADDOCK, NORTH DAKOTA.

CORD-HOLDER.

SPECIFICATION forming part of Letters Patent No. 783,065, dated February 21, 1905.

Application filed July 2, 1904. Serial No. 215,122.

*To all whom it may concern:*

Be it known that I, JENS M. J. NESS, a citizen of the United States, residing at Maddock, in the county of Benson and State of North Dakota, have invented a new and useful Cord-Holder, of which the following is a specification.

This invention relates to twine or cord holders, and has for its object to provide an improved device of this character capable of containing and housing a ball of cord with the free portion of the cord exposed in position for convenient access thereto to enable the drawing off of any desired length of cord from the ball and to effect automatic rewinding of the surplus loose portion of the cord after the desired length has been cut therefrom.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 2:
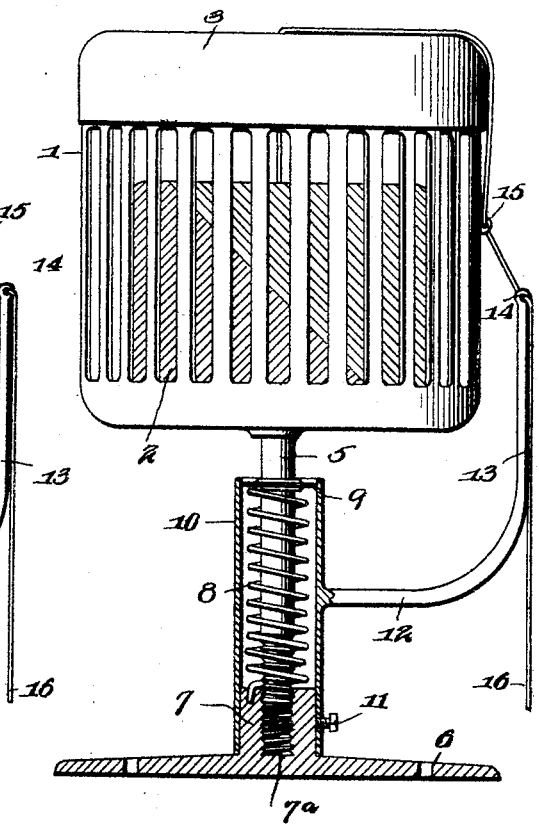

In the drawings, Figure 1 is a sectional view of a cord-holder embodying the features of the present invention with the parts in their normal positions. Fig. 2 is a similar view showing the position assumed by the device when cord is being drawn therefrom and in readiness to effect an automatic rewinding of the surplus cord when the free end of the cord is released.

Like characters of reference designate corresponding parts in each figure of the drawings.

The present device includes a cup-shaped receptacle 1, which is open at its top for the reception of a ball of cord 2, and it may be of skeleton form, so as to expose the ball, and thereby enable the user to readily determine the approximate amount of cord remaining in the cup or receptacle. A removable cover 3 is fitted upon the top of the receptacle and is provided with a central opening 4, through which the cord is passed from the cord-ball. For the support of this receptacle there is a stem 5 depending from the bottom thereof and supported at its lower end upon a suitable base 6. This base has a central upstanding boss 7, which is internally screw-threaded to form a threaded socket $7^a$, which receives the lower externally-screw-threaded terminal of the stem 5. A helical spring 8 embraces the stem and has one end connected to the socket $7^a$ and its opposite end connected to the stem through the medium of a collar or flange 9, carried by the stem and constituting a guide working in the cylindrical casing 10, which snugly embraces the socket $7^a$ and is detachably and rigidly connected thereto by means of a set-screw 11. Normally the cup or receptacle 1 rests upon the top of the cylindrical casing 10, which latter constitutes a support for the cup in addition to that afforded by the stem 5. A substantially radial arm 12 extends outwardly from an intermediate portion of the tubular casing 10 and beyond the cup or receptacle 1, with its outer end extended upwardly to form a standard 13, having its upper end disposed substantially midway between the top and bottom of the cup or receptacle and provided with an eye 14, which is adjacent the eye 15, carried externally by the cup.

In using the device the cover 3 is removed and the ball of cord 2 is placed within the cup, after which the cover is replaced, with the free end of the cord passing outwardly through the opening 4 in the top thereof. The cord is then passed downwardly through the guide 15 and then wrapped around the exterior of the cup or receptacle a suitable number of times, and finally the free end of the cord is passed through the guide 14 and thence permitted to hang downwardly therefrom. Upon pulling upon the free portion 16 of the cord the latter will be unwound from the cup or receptacle 1, thereby rotating the latter, together with its stem 5, whereby the cup and the stem will be elevated to the position shown in Fig. 2 of the drawings by reason of the screw-threaded connection between the stem and the socket $7^a$. During the elevation of the cup the coiled spring 8 will be extended by reason of its lower end being fixed to the boss 7 and its opposite end connected to the stem, whereby the spring will be under tension, and when a suitable portion of cord has been removed and the free end of the surplus cord released the tension of the spring will operate to rotate the cup in a reverse direction to that of its original rotation, thereby rewinding the surplus cord upon the exterior of the cup and returning the latter to its normal position seated upon the top of the casing 10. The casing 10 stops the downward movement of the receptacle 1 before the stem 5 becomes jammed against the bottom of the socket 7ª under the action of the spring, thereby to insure a prompt rotation of the receptacle when drawing upon the free end of the cord.

It will here be explained that after the cord has been unwound from the exterior of the cup or receptacle the latter will cease to rotate, and cord will then be supplied directly from the ball, whereby as the rotation of the cup is limited its upward movement will also be limited so as to prevent disengagment of the stem 5 from the seat or socket 7. The tension upon the cord occasioned by the user of the device is sufficient to overcome the tendency of the spring 8 to return the cup to its original position, and therefore this automatic rewinding of the cord cannot take place until the user of the device has released the free end of the cord.

While the device has been illustrated in the drawings and described in an upright position, it is apparent that it may be inverted for convenience in attaching the base 6 to the under side of a counter or other support and it may be placed in a horizontal position for attachment to a wall without affecting the operation of the device.

Having thus described the construction and operation of my invention, what I claim as new, and desire to secure by Letters Patent, is—

1. A cord-holder of the class described including an attaching-base, a cord-receptacle having a stem which is provided with a rotatable screw-threaded connection with the base, a helical spring embracing the stem with one end connected to the stem and its opposite end connected to the base, a cord-guide carried by the receptacle, another cord-guide independent of the receptacle, and a tubular casing carried by the base and inclosing the stem, said casing being in the path of the return movement of the receptacle to form a stop therefor.

2. A cord-holder of the class described including an attaching-base, a cord-receptacle having a stem which is provided with a rotatable screw-threaded connection with the base, a tubular casing carried by the base and inclosing the stem, an annular shoulder upon the stem and working in the casing as a guide, a helical spring embracing the stem within the casing with one end connected to the shoulder and its opposite end connected to the base, and cord-guides, one of which is carried by the receptacle.

3. A cord-holder of the class described including an attaching-base, a cord-receptacle having a stem provided with a rotatable screw-threaded connection with the base, a tubular casing carried by the base and inclosing the stem, an arm carried by the casing with its outer end overlapping the receptacle and provided with a cord-guide, a cord-guide upon the receptacle, and a spring connected to the base and the receptacle and capable of being placed under tension by the unwinding of cord to return the receptacle to its normal position when the cord is released.

4. A cord-holder of the class described including an attaching-base having a screw-threaded socket, a cord-receptacle having a stem provided with a rotatable screw-threaded engagement with the socket, a removable cover for the receptacle provided with a cord-guide, a cord-guide upon the exterior of the receptacle, a tubular casing embracing the socket and the stem, an annular shoulder upon the stem and working in the casing as a guide, a helical spring embracing the stem with one end connected to the shoulder and its opposite end connected to the socket, and an upwardly-bowed arm carried by the casing with its upper end overlapping the receptacle and provided with a cord-guide.

5. A cord-holder of the class described including an attaching-base having a sleeve, a cord-receptacle having a stem received within the sleeve and provided with a rotatable threaded connection with the base, a helical spring embracing the stem within the sleeve and connected to the receptacle and the base, a cord-guide carried by the receptacle, and another cord-guide independent of the receptacle, the sleeve lying in the path of the return movement of the receptacle to form a stop therefor.

In testimony that I claim the foregoing as my own I have hereto affixed my signature in the presence of two witnesses.

JENS M. J. NESS.

Witnesses:
 OLIVER OLSON,
 WESLEY STYLES.